(12) United States Patent
Gao

(10) Patent No.: US 11,260,717 B2
(45) Date of Patent: Mar. 1, 2022

(54) CHASSIS

(71) Applicant: DALU Robotech, Technology (Beijing) Co., Ltd., Beijing (CN)

(72) Inventor: Yuan Gao, Beijing (CN)

(73) Assignee: DALU ROBOTECH, TECHNOLOGY (BEIJING) CO., LTD., Beijing (CN)

( * ) Notice: Subject to any disclaimer, the term of this patent is extended or adjusted under 35 U.S.C. 154(b) by 14 days.

(21) Appl. No.: 16/606,897

(22) PCT Filed: Apr. 25, 2018

(86) PCT No.: PCT/CN2018/084321
§ 371 (c)(1),
(2) Date: Oct. 21, 2019

(87) PCT Pub. No.: WO2018/201937
PCT Pub. Date: Nov. 8, 2018

(65) Prior Publication Data
US 2020/0276877 A1 Sep. 3, 2020

(30) Foreign Application Priority Data
May 4, 2017 (CN) .......................... 201710308901.0

(51) Int. Cl.
*B60G 17/016* (2006.01)
*B62D 7/15* (2006.01)
*G05D 1/00* (2006.01)

(52) U.S. Cl.
CPC ....... *B60G 17/0162* (2013.01); *B62D 7/1581* (2013.01); *B60G 2200/10* (2013.01);
(Continued)

(58) Field of Classification Search
CPC ............ B60G 17/0162; B60G 2200/10; B60G 2200/422; B60G 2200/445;
(Continued)

(56) References Cited

U.S. PATENT DOCUMENTS 4,022,290 A * 5/1977 Boyer ...................... F41H 7/02
180/14.1
4,932,489 A 6/1990 Evans et al.
(Continued)

FOREIGN PATENT DOCUMENTS

| | | |
|---|---|---|
| CN | 202896207 U | 4/2013 |
| CN | 103661669 A | 3/2014 |

(Continued)

OTHER PUBLICATIONS

Machine Translation of EP1502843 (Year: 2005).*
Machine Translation of DE4005356 (Year: 1991).*

*Primary Examiner* — Paul N Dickson
*Assistant Examiner* — Kurtis Nielson
(74) *Attorney, Agent, or Firm* — Muncy, Geissler, Olds & Lowe, P.C.

(57) ABSTRACT

A sport-wheeled chassis is provided for connecting to a mobility device, which comprises a suspension set up under the bottom of the mobility device, a steering pivotally connected to the suspension, a controller connected to the suspension and steering electrically, tires which are pivotally connected to the steering and disposed under the steering, and a steering shaft of the steering which coincides axially with the steering shaft of the tire so that the controller can operate the turning direction of the tire and the height of the suspension through the suspension and the steering. The chassis is not only with a simple structure, but also with a suspension to control the height of the chassis off the ground, so that the chassis can maintain stability in any (Continued)

rugged environment, and, with its attached wheels, the chassis can move to desired places fast and accurately.

18 Claims, 12 Drawing Sheets

(52) U.S. Cl.
CPC .. *B60G 2200/422* (2013.01); *B60G 2200/445* (2013.01); *B60G 2200/46* (2013.01); *B60G 2200/464* (2013.01); *B60G 2500/30* (2013.01); *G05D 1/0088* (2013.01)

(58) Field of Classification Search
CPC .......... B60G 2200/46; B60G 2200/464; B60G 2500/30; B60G 57/02; B60G 57/028; B60G 17/015; B62D 7/1581; A61G 5/06; A01D 34/008; G05D 2201/0207; G05D 2201/0218; G05D 2201/0209
See application file for complete search history.

(56) References Cited

U.S. PATENT DOCUMENTS

| | | | | |
|---|---|---|---|---|
| 4,977,971 | A * | 12/1990 | Crane, III | B25J 5/00 180/8.3 |
| 6,131,919 | A * | 10/2000 | Lee | B60G 17/016 180/41 |
| 8,540,040 | B2 * | 9/2013 | Simula | B62D 55/075 180/9.46 |
| 2003/0183427 | A1 * | 10/2003 | Tojo | B62D 61/12 180/8.1 |
| 2007/0108712 | A1 * | 5/2007 | Ryan | B60G 15/067 280/124.1 |
| 2015/0134202 | A1 * | 5/2015 | Dawson | B62D 6/007 701/41 |
| 2016/0157414 | A1 * | 6/2016 | Ackerman | A01B 69/008 701/25 |
| 2016/0176452 | A1 * | 6/2016 | Gettings | B62D 55/0655 180/167 |
| 2016/0251044 | A1 * | 9/2016 | Klassen | B62D 57/022 180/8.7 |
| 2016/0362147 | A1 * | 12/2016 | Mailey | B62D 55/075 |
| 2017/0015168 | A1 * | 1/2017 | Estier | B62D 7/1509 |
| 2017/0043643 | A1 * | 2/2017 | Rambaud | B60G 99/002 |
| 2019/0234453 | A1 * | 8/2019 | Potter | B60G 99/00 |

FOREIGN PATENT DOCUMENTS

| | | | |
|---|---|---|---|
| CN | 105479433 A | 4/2016 | |
| CN | 105774899 A | 7/2016 | |
| CN | 106476550 A | 3/2017 | |
| CN | 107160963 A | 9/2017 | |
| DE | 4005356 A1 * | 8/1991 | ............. B62D 11/20 |
| DE | 102006001055 A1 * | 7/2007 | ........... B62D 57/028 |
| DE | 102013000724 A1 * | 7/2014 | ............... A61G 5/04 |
| EP | 1502843 A2 * | 2/2005 | ........... B62D 7/1509 |
| KR | 20100032244 A | 3/2010 | |

\* cited by examiner

CHASSIS

CROSS-REFERENCE TO RELATED APPLICATION

This application claims priority to China Patent Application No. 201710308901.0, filed May 24, 2017, the contents of which are hereby incorporated by reference to their entirety.

FIELD OF THE INVENTION

The present invention provides a chassis, which relates to that part specifically allowing the robot to move freely.

BACKGROUND OF THE INVENTION

With the rapid development of technology, the technology of vehicle engineering has also improved. Generally a vehicle is divided into two parts: the shell and the chassis. The common chassis includes several parts, such as tires, frames, the steering, actuators, brakes and the suspension. Tires, the steering and the suspension are the core and the most important parts of the vehicle as they control the direction of traveling and avoid overturning. In general, when a vehicle is traveling, it encounters problems such as turning and crossing obstacles. Therefore, how to make vehicles travel stably and turn smoothly is the major issue in vehicle engineering. In terms of turning, the tires and the steering are the controlling core of the shell. The conventional steering is a single connecting-rod steering part, as disclosed in FIG. 1a. The characteristic of the single connecting-rod steering is that the drivers can control the front wheels independently and directly. For example, for a four-wheel car, two steering control the front wheels independently. When drivers want to turn, they just need to turn the steering wheel and the tires will turn in the direction that they want to go. The front wheels, which are controlled by the steering wheel, will turn as well, and then the rear wheels will also turn in the same direction. This kind of steering is good enough for four-wheel sedan cars. However, for special vehicles with more wheels, such as six-wheel armored cars, jeeps, buses or multi-wheel tanks, a single connecting-rod steering is not applied to these vehicles.

In addition, the function of the suspension is to keep vehicles and shells stable and to isolate the chassis because of obstacles encountered during travel, causing bounce and vibration. The suspension is mainly composed of a spring and a damper and is usually just regarded as such. For civilian-use sedan cars, the general suspension is divided into independent and non-independent types. The characteristic of the independent suspension is that left and right tires of the chassis are controlled separately. However, the characteristic of the non-independent suspension is that all tires of the chassis are controlled by one suspension. Suspensions are also divided into active and non-active types. The main difference between these two types is that the elastic constant and the damping coefficient of the active suspension can be controlled by the computer. After the user has set up the elastic constant and the damping coefficient, the active suspension can adapt to different road environments. However, the elastic constant and the damping coefficient of the non-active suspension are fixed. They will not change automatically in response different environments; therefore, its adaptability is poor.

The tire is a kind of device covered with metal, wood or rubber circumferentially. Its circumferential-covering material is called the tire skin and its center has a rim. The rim is fixed with the motor. Generally, the motor is placed on the wheel hub of the tire i.e., the motor is placed in the center of the tire and surrounded by the tire skin; or on the periphery of the tire, which generally means that the motor is not in the center of the tire, but adjacent to the tire; or on the connecting rod, which is adjacent to the actuator controlling the speed of the tires and the signals from the steering while the vehicles are traveling. Typically the tires used in cars are ordinary tires, which mean that the tire skin is rubber, and the motor is fixed beside the tire. The differences for conventional tires are in the designs of the treads and the shapes of the rims. However, when the tires are fixed to the steering, they are not ideally perpendicular to the steering or perpendicular to the ground. They have inclined angles, as shown in FIG. 1b. Where the camber angle is the angle $\theta 1$ between the wheel centerline Z1 of the tire 14 and the normal vector of the horizontal D1; the inclined angle is the angle $\theta 2$ between the axial direction Z2 of the steering 12 and the normal vector of the horizontal Z1; and the toe angle is the angle $\theta 3$ between the rolling direction Y1 of the front tires 14 and the vehicle's traveling direction D2, etc. The inclined angles mentioned above make the steering part bear a force parallel to the ground and the force directed to the steering part when the vehicle is traveling. These forces cannot be countered by the suspension because the suspension can only buffer a force that is perpendicular to the ground. Therefore, the force directed to the steering part is likely to wear both the steering and the rim out.

General civilian vehicles have multi-connecting rod steering, single connecting independent suspension and the motor fixed around the tire. The key points about the design for general civilian vehicles are how to maintain the stability of the vehicles at high speed and how to make the turning radius of the shell small while the vehicles are travelling. For example, there is a prior invention that discloses that both the front and rear tires of one adjustable vehicle chassis use multi-connecting rod suspensions; and that two steering wheels and a cooperative control system are provided. Although this design makes the turning easy and the turning angle small, multiple steering wheels and multiple drivers are required, and the size and space of the device are extremely large. Also, it is required to have several actuators to control the tire direction to achieve the minimum turning angle. This kind of design is suitable for recreational carting vehicles but not for general civilian vehicles.

In addition, the chassis for vehicles can also be used in robots. Since robots are mostly used in the wild woods or on rugged terrain, the chassis for them has better suitability for such environments than the chassis for vehicles. Therefore, if we want to apply the chassis for vehicles to the chassis for robots, the technology still has a lot of room for improvement. Another prior technology has disclosed a vehicle with a slip-knot suspension and a method for using it. That disclosed chassis is suitable for military-use vehicles, which have better adaptability for any rugged and obstacle-filled environments, and their tires also have good mobility. However, the chassis disclosed in that invention cannot 'lead' the robots to climb ladders or turn in any traveling direction; and its connecting mobility devices do not specify that they are for robots or for vehicles, which means that the impact on the operation of the chassis from changes in the mobility devices is not considered.

In summary, the prior technology lacks a stable chassis that can carry a robot, that has a small turning radius and that can climb ladders with good mobility.

SUMMARY OF THE INVENTION

With regard to the disadvantages of the previous invention, the present invention provides both a chassis that improves on the disadvantages mentioned above and a robot that utilizes this improved chassis.

The object of the invention is to provide a chassis which not only has a simple structure, but also a suspension to control the height of the chassis off the ground, so that the chassis can maintain stability in any rugged environment and can move to the desired place fast and accurately.

Besides, the other object of the invention is to supply a widely-used chassis which can be suitable for every type of vehicle.

The present invention provides a chassis which is connected to a mobility device, and includes the following: a suspension set up under the bottom of the mobility device; a steering connected pivotally to the suspension; a controller connected to the suspension and steering electrically; wheels which are pivotally connected to the steering and set up under the steering; and a steering shaft of the steering which coincides axially with the steering shaft of the wheel so that the controller can control the turning direction of the wheel and the height of the suspension through the suspension and the steering.

Preferably, the suspension is selected from an independent suspension, a non-independent suspension or a mechanical leg-type of the independent suspension. Preferably, the suspension is to adjust the height of the chassis off the ground.

Preferably, the steering has a damper that connects the center of the wheel.

Preferably, the steering can change the following angles of the wheels: the camber angle, the inclination angle, the toe angle and the caster angle.

Preferably, the controller is electrically and wirelessly connected to the suspension and the steering.

Preferably, the wheel is a spherical wheel or a drum wheel. Preferably, this chassis has the following operating modes: an obstacle mode, a climbing mode, a stairs mode and a turning mode.

Preferably, the chassis has 360-degree straight and rotating structures when the chassis is in the turning mode.

Preferably, the device has a shell, a bottom portion and a chassis. The shell and the bottom portion are pivotally connected to each other by a pivot shaft, and the chassis is pivotally connected to the bottom portion.

This invention provides a chassis not only with a simple structure, but also with a suspension to control the height of the chassis off the ground, so that the chassis can maintain stability in any rugged environment, and, with its attached wheels, the chassis can move to desired places fast and accurately. The chassis can be used in robots or vehicles for different purposes.

This invention provides a chassis with an obstacle mode, a climbing mode, a stairs mode and a turning mode, so that the chassis can travel in any rugged environment.

Therefore, it can be widely used in robots and vehicles.

DETAILED DESCRIPTION OF THE PREFERRED IMPLEMENTATION

To make the objects, technical features and advantages of this present invention easy to understand for skilled engineers and easy to implement, a description of the progress of the preferred implementation will be stated below. The drawings referred to hereinafter are intended to be illustrations of the features of the present invention and are not necessarily required to be fully drawn according to the actual situation. If the description of the implementations of this present invention relates to technical contents which are all well known to skilled engineers, they will not be described.

Figure 1A:
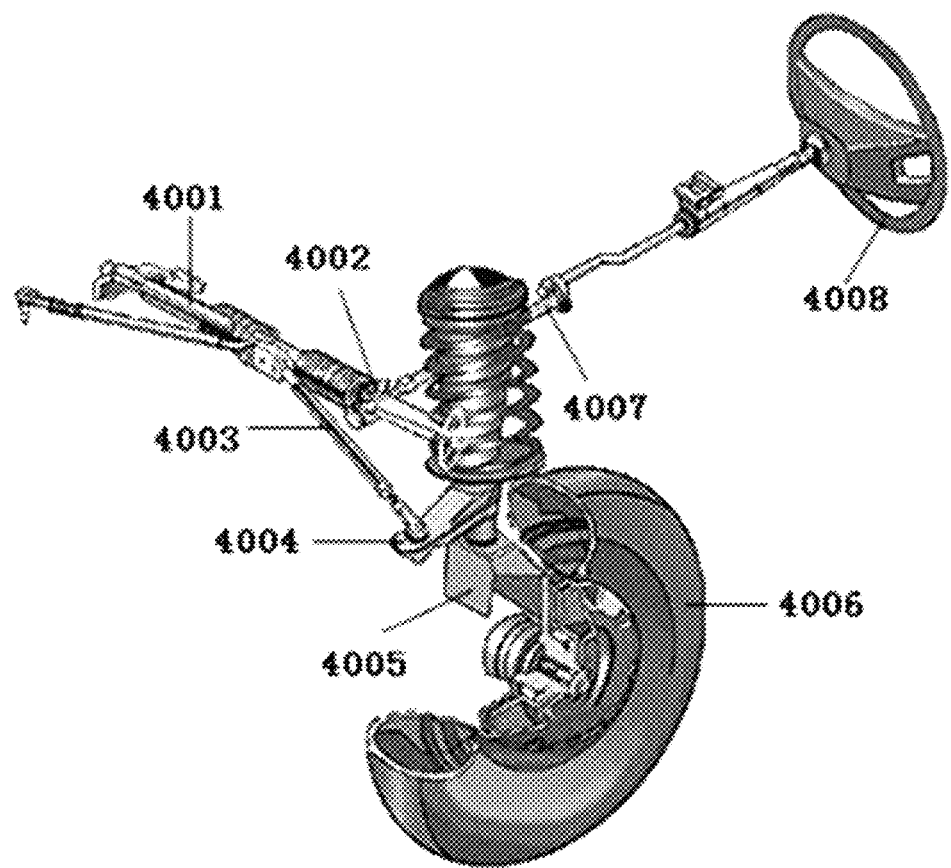
FIG. 1a shows the geometric view of the arrangement of the conventional steering.
Figure 1B:
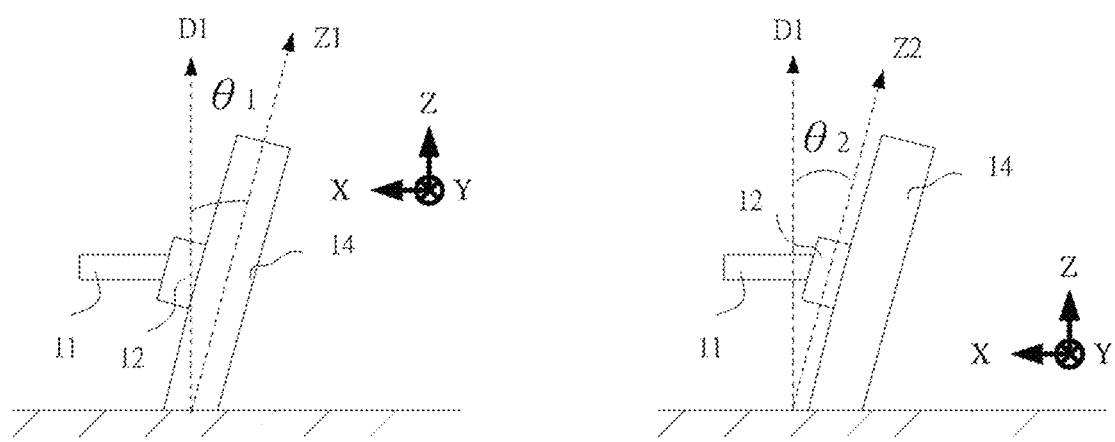
FIG. 1b shows the geometric view of the motion of the tire by conventional steering.
Figure 1B:
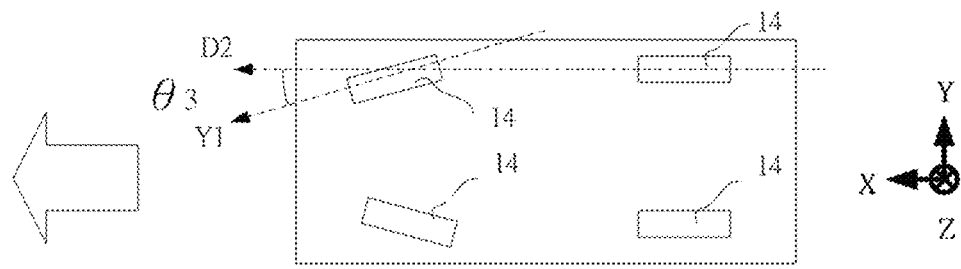
Figure 2:
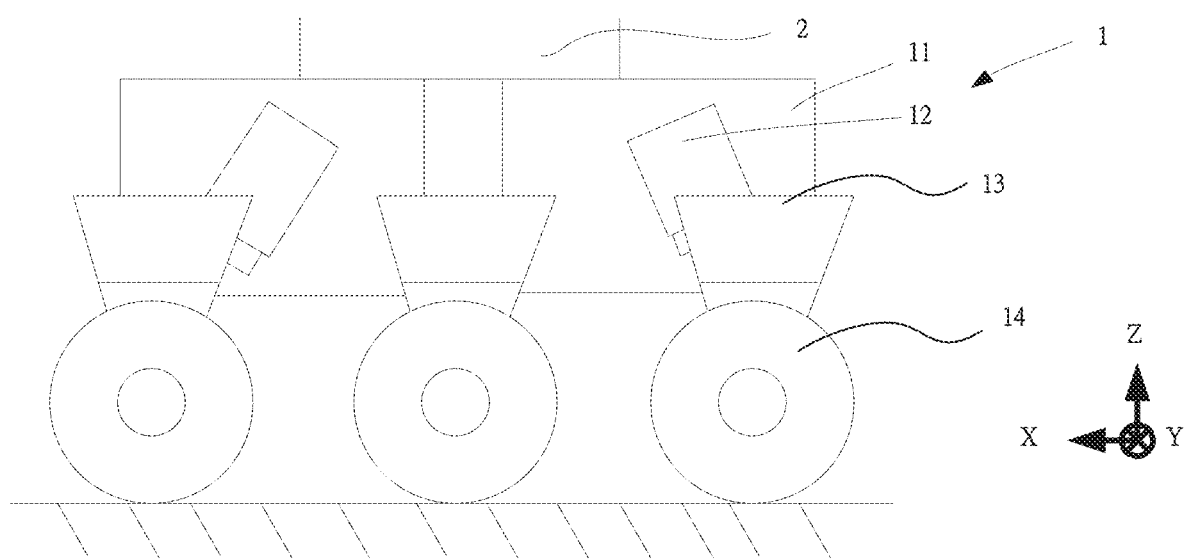
FIG. 2 shows the structural diagram of the chassis.

First, please refer to FIG. 2, which discloses a structural diagram of the chassis 1. In this specific embodiment of this present invention, the drawings and the description of the manuals all use the Cartesian coordinate system, which is commonly used as a coordinate system in vehicles. As disclosed in FIG. 2, the plane formed by the X direction and the Z direction is the paper surface; the +Y direction is the direction of entering the paper surface; and the direction of the subsequent drawings is changed according to the description. FIG. 2 discloses that the chassis 1 is set up below the mobility device 2. The size of the chassis 1 can be changed depending on the type of mobility device 2. In regard to the implementation of the present invention, the mobility device 2 may be a movable device such as a robot or a vehicle. Therefore, the chassis 1 disclosed in the present invention can be applied to the mobility device 2. This mobility device can be classified as a robot head, the chest, the abdomen, or the vehicle's shell. The chassis 1 may be wrapped in the mobility device 2 and the mobility device 2 serve as a cover on the chassis 1. The chassis 1 includes a controller (not shown in FIG. 2), a suspension 11, a steering 12, a sensor 13, and wheels 14. The controller is electrically connected to the suspension 11, the steering 12, the sensor 13, and the wheels 14, respectively. The function of the controller is to control all main components of the chassis 1, including receiving signals, processing and sending out commands. The controller can be fixed on the chassis 1 anywhere in any manner. For example, the controller can serve as a 'master' of the chassis 1 in the form of a chip or a receiver. For convenience, the position of the controller is not disclosed in FIG. 2. The suspension 11 and the steering 12 are connected to each other, and the wheels 14 are connected to the sensor 13 and the steering 12 respectively. For the specific embodiment of the present invention, the suspension 11 is composed of multi-connecting rods, a spring and a damper. The suspension 11 has different effective elastic constants by using different materials or structures. When the road surface is uneven, the wheel 14 exerts an external force on the suspension 11 due to the shaking of the wheels 14. According to Hooke's law, the suspension 11 generates displacement relative to the ground due to the external force. At this time, the suspension 11 prevents the displacement from being transmitted to the mobility device 2 and affects the stability of the mobility device 2. Therefore, the suspension 11 will adjust its own elastic coefficient and damping coefficient so that the displacement can quickly slow down and disappear. When the displacement is transmitted to the chassis, the shaking of the mobility device can be effectively reduced while the control system of the robot is travelling. The suspension 11 is connected to the controller. Through computing and sending out signals by the controller, the modules of rigidity and the damping coefficient of the suspension 11 can be adjusted (corresponding to the elastic coefficient (K) in Hooke's law). Therefore, the shaking of the mobility device can be reduced and the height between the chassis and the ground can be adjusted (i.e., the height of the suspension), in order to adjust the center of the mass of the mobility device 2 appropriately and to ensure the mobility and stability of the mobility device 2.

The steering 12 is connected to the suspension 11 by applying a pivot connection or screwing method. The steering 12 is known to be pivoted by multi-connecting rods or gearwheels. If the mobility device 2 is a vehicle, the gearwheels and the multi-connecting rods are generally included. When the mobility device 2 is a robot, gearwheels are mostly used to reduce the size. In the present implementation, the steering 12 is composed by multi-connecting rods. The function of the steering 12 is to assist the wheels 14 in turning the rotating shaft in the Z-axis direction and to move the chassis towards the set coordinates. The sensor 13 is electrically connected to the controller for detecting the position of the wheels 14 and for transmitting the position signal or the environmental conditions to the controller for calculating the turning position of the mobility device 2. The sensor 13 can be generally composed by a photosensitive coupling component CCD, a photodiode or an image sensor. The steering 12 can be connected around the wheel hub of the wheel 14 by a conventional practice. However, another specific implementation involves the steering 12 fixed at the center of the wheel 14, which means that the steering 12 is used as the steel ring of the wheel 14. In this manner, the steering 12 is called a wheel hub motor. The wheel hub motor can greatly reduce the volume of the entire machine, so as to the wheel 14 is closer to the chassis 1. Therefore, the influence on the side angle or the camber angle when the wheel 14 is travelling can be greatly reduced.

For this implementation of the present invention, the wheel hub motor is kind a motor-like structure. For example, it has a rotor and a stator. The rotor is connected to the tire skin of the wheel 14 and the stator is fixed to the center of the wheel 14. As with the conventional motor principle, the rotation of the rotor is operated by cutting the stator magnetic field. If the steering 12 controls the direction of the stator magnetic field, then the direction of the wheel can be controlled so that the wear and tear of the center of the wheel 14 and the steering 12 can be reduced. In addition, different tread patterns of the wheels 14 may be used for different topography, and the thickness and radius of the wheel 14 are not limited. The number of wheels 14 is not to limit in this implementation of the present invention if they can support the shell and the shell can move stably. Preferably, when the number of wheels 14 is six, it is more stable and obstacle-tolerant than that is four. The steering 12 is electrically connected to the controller and the manner of connection may be wireless to facilitate steering control. In the present invention, the steering 12, the sensor 13 and the wheel 14 are controlled by a one-to-one. However, the number of wheels 14 can be more than the number of the steering 12 and the sensors 13. In order to achieve the best controlling performance, the number of the steering 12, the sensor 13 and the wheel 14 are the same, which means the number of the steering 12 is equivalent to the number of the sensor 13 or the number of the wheel 14. For example, in one embodiment of the present invention, the number of the wheel 14 is six, of the steering 12 is six and of the sensor 13 is six. In another implementation of the present invention, the number of the wheel 14 is six, but the number of the steering 12 is four and the sensor 13 is four. That means there are two wheels 14 without any steering and sensor attached to them. This embodiment is called 4-wheel steering. Two wheels 14 without any steering 12 and the sensor 12 attached to them, are called passive wheels. The passive wheel only has the function of dispersing the weight of both the mobility device 2 and the suspension 11, and so of supporting these two components. The position of these two passive wheels is not within the limits of the invention. In another embodiment of the present invention, the number of the wheel 14 is four, the steering 12 is four and the sensor 13 is four, which is called 4-wheel driving. The wheel 14 used in the present invention can be rotated within 360-degrees using a special structure (the rotation axis is the Z axis). The rotation axis is close to the center of the wheel hub, therefore, the rotation radius is small and the space needed for rotating is small as well. Since the suspension 11 controls the wheel 14 in a one-to-one manner, the steering angle of each wheel 14 may be different and some of the wheels 14 may be identical. It should be noted that the wheel hub refers to the wheel's intermediate ring, the radial steel bar and the axle assembly, which is already known vehicle engineering, and also this is a technology that can be easily known by skilled engineers, so it will not be stated more here. The wheel 14 has different settings depending on the type of mobility device 2. For example, the carcass of the wheel 14 may be a mecanum wheel, an omni wheel, a general rubber wheel 14 for vehicles. It is possible to use the wheel with drum-type wheel, the wheel with spherical-type or the wheel that is made by rubber for general vehicle. All types of the wheels 14 arranged in the chassis 1 do not have to be the same. They may select the types of the wheels 14 mentioned above according to the needs of the users. For example, if it is a robot, a four-wheel designed chassis can be used to save costs. The front two wheels can use the mecanum wheels and the rear two wheels can use general rubber wheels 14.

Figure 3:
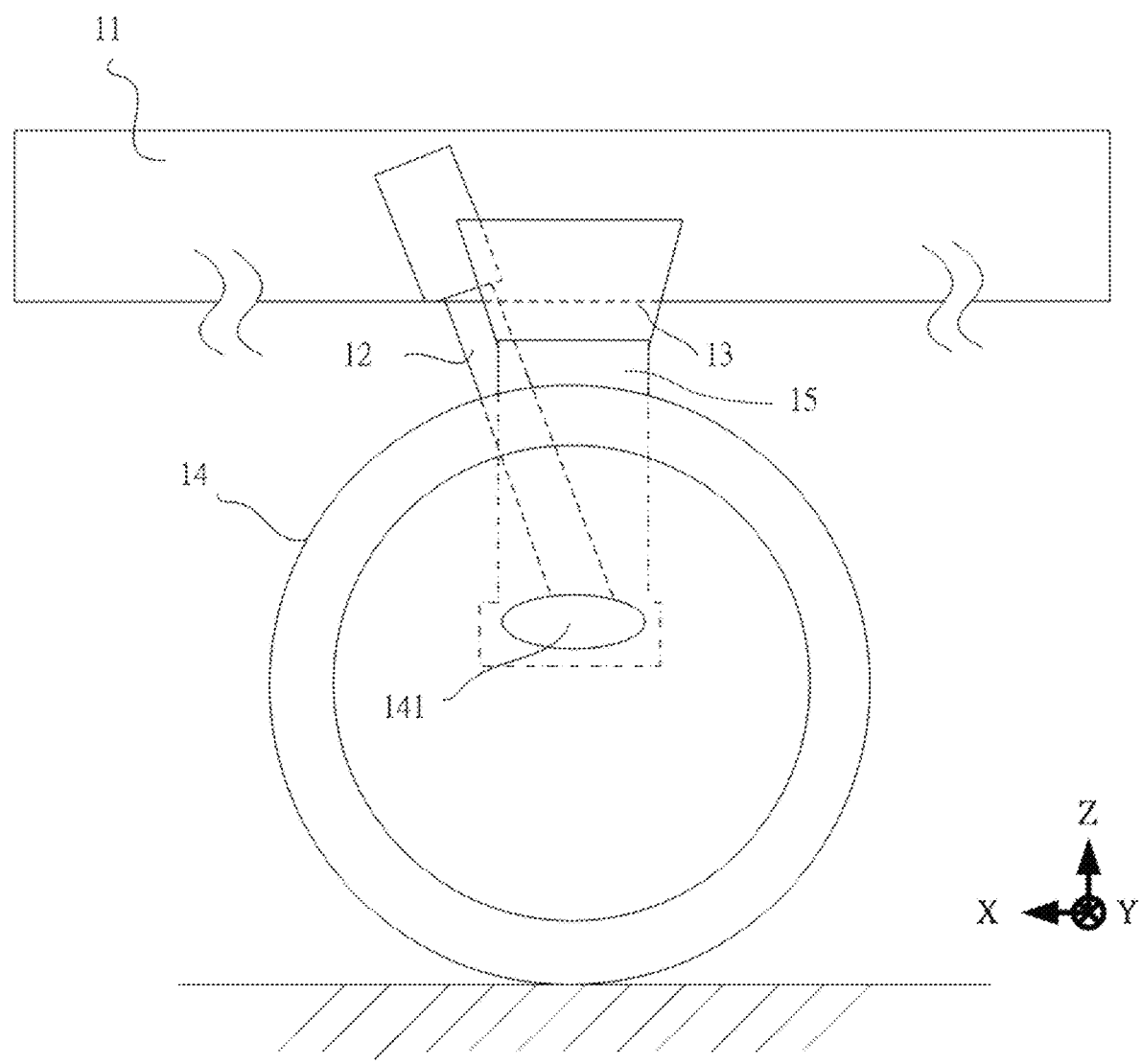
FIG. 3 shows the side view of the chassis.

FIG. 3 shows a structural view of the chassis 1, which is an enlarged view of FIG. 2; the controller is not disclosed. Only one wheel 14 is shown in the FIG. 3 viewed from the +Y direction; the sensor 13 is driven by a motor 141, which is screwed into the center of the wheel 14 by a long lever 15. Besides monitoring the coordinate position and speed of the wheel 14, the sensor 13 also needs to monitor the coordinate positions of the steering 12 and the suspension 11; so that the sensor 13 needs to be set up on the outside of the wheel 14. Here the sensor 13 cannot rotate with the wheel 14 and cannot have declined or inclined angles with the suspension 11 to ensure accurate positioning. The steering 12 is driven by the motor 141, which is also screwed into the center of the wheel 14 by a long rod.

In another embodiment, the steering 12 may not have a long rod. The long rod only has the function of electrically connecting to the chassis 1. In such a way, the steering 12 is directly fixed on the motor 141. The motor 141 of this embodiment are also known as the wheel hub motor.

Figure 4:
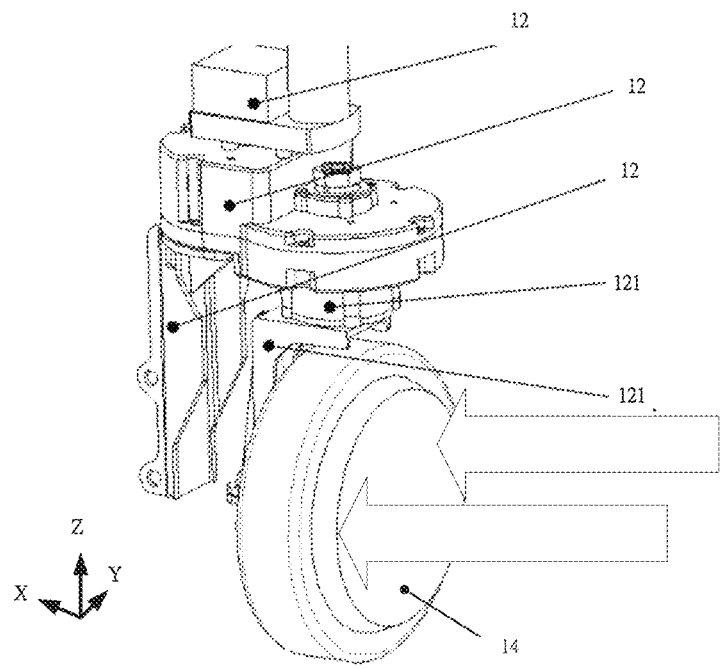
FIG. 4 shows the structural diagram of the damper and the steering in the chassis.

FIG. 4 is a structural diagram showing the structure of the damper 121 attached to the steering 12 of the chassis 1 as disclosed by this technology, but the controller is not disclosed here in the diagram. The damper 121 is connected to the center of the wheel 14. The function of the damper 121 is to counter the force on the wheel 14 caused by the fixed or adjustable camber angle of the wheel 14 to the Y direction of the steering 12. (See the arrow shown in FIG. 4) Thus the wheel 14 is provided with a buffering function.

Figure 5:
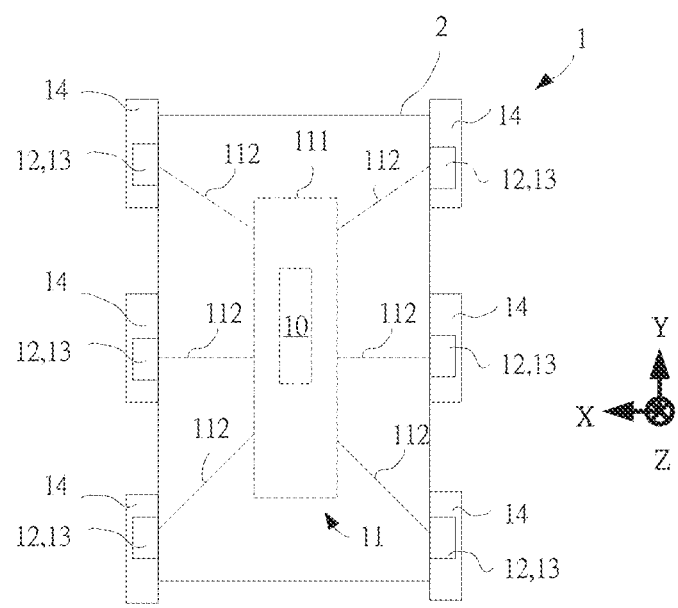
FIG. 5 shows the side-view of the chassis.

FIG. 5 discloses a perspective of the chassis viewed from the Z direction and shows aerial views while the chassis is at rest state. If viewed from the Z direction, the mobility device 2 will be blocked by the chassis 1. Since the chassis 1 is generally attached on the plane of the mobility device 2 towards the ground, the chassis 1 will be blocked by the mobility device 2. The blocked parts of the chassis 1 are indicated by dashed lines. As seen in FIG. 5, the suspension 11 includes a center column 111 and a plurality of connecting columns 112. Its structure is like the spine and feet of an Arthropod. The center column 111 and the plurality of connecting columns 112 are connected to the wheels 14 separately. The controller 10 is attached to the center column 111, so the controller 10 can send and receive independently the controlling signals or the censoring signals from the wheels 14. The center column 111 and the plurality of connecting columns 112 are all made from connecting rods, which are generally tubular objects made of iron or plastic. The wheel 14 is attached closely to the mobility device 2 when the chassis 1 is at rest state, which means when the switch of the mobility device 2 is closed, the wheel 144 is automatically retracted by the mobility device 2. A steering 12 and a sensor 13 are attached above the wheel 144.

Figure 6:
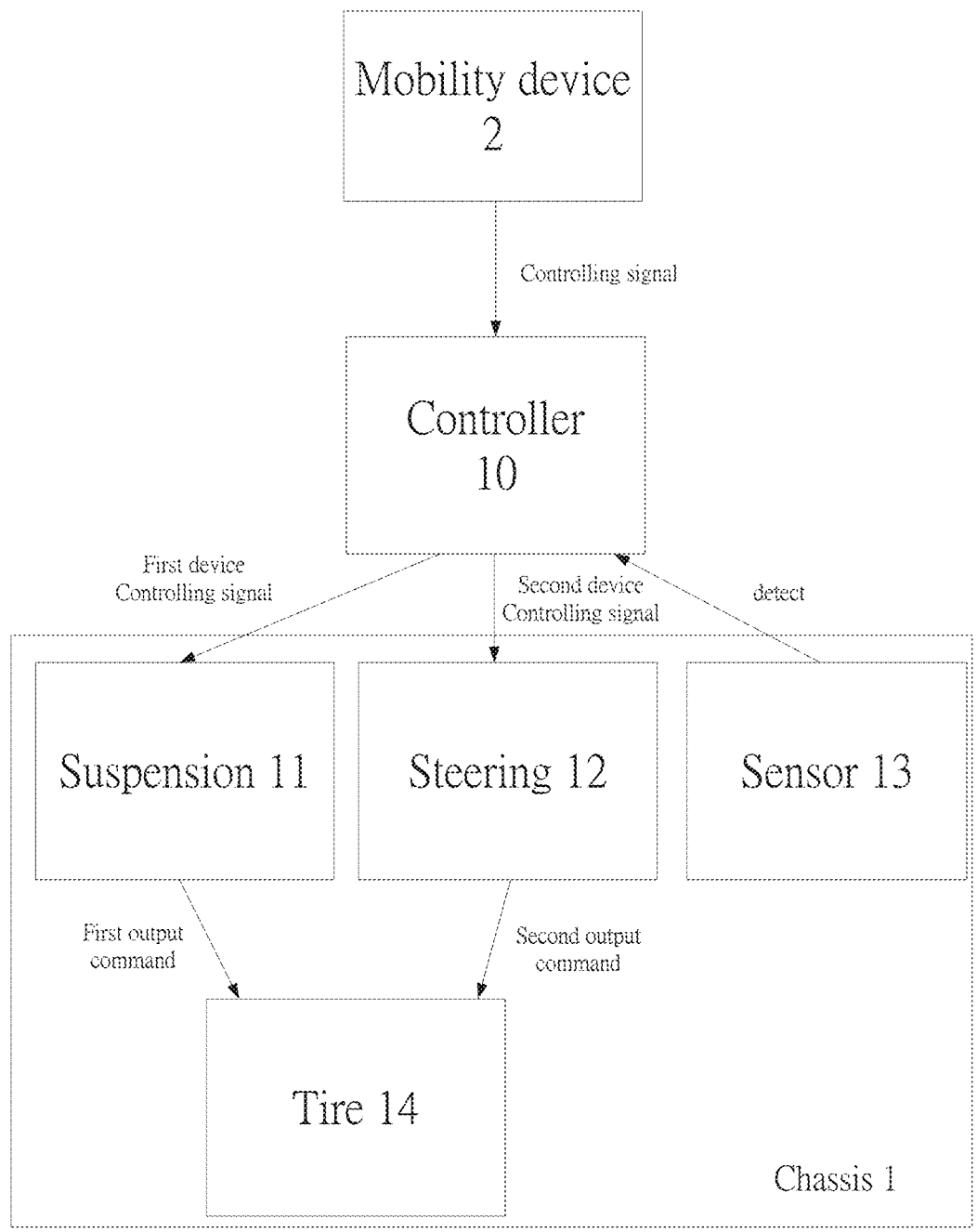
FIG. 6 shows the system diagram of the chassis.

FIG. 6 is a diagram showing the connecting relationship of the components of the chassis 2. Here a controlling signal is sent by the mobility device 2: for example, when the mobility device 2 is a vehicle, the driver will control the steering wheel, hit the brake or transfer the file. And when the mobility device 2 is a robot, the head of the robot will send out the controlling signals; all the controlling signals are included, and these may include turning, decelerating, lifting, or climbing. The ways in which the signal is presented are not within the scope of the present invention. After receiving the controlling signals, the controller 10 sends a first device controlling signal to the suspension 11, and then sends a second device controlling signal to the steering 12. The first device controlling signal is, for example, a command for the coordinate values to command the suspension for the next position. The second device controlling signal is, for example, a command for the angle vector value or a velocity vector value. After the first device controlling signal and the second device controlling signal are processed by the suspension 11 and the steering 12, respectively, the first output command and the second output command are sent out to the wheel 14. The first output command is, for example, to adjust the camber angle of the wheel 14; and the second output command is, for example, to adjust the side angle of the wheel 14 or the rolling speed of the wheel 14 to meet needs of the controlling signals. In addition, the sensor 13 also detects the condition of the wheel 14 at any time, including the camber angle and the side angle of the wheel 14 the relative position of the wheel 14 and the mobility device 2, the traveling direction of the wheel 14, the traveling speed or the rolling direction of the wheel 14 and then sends out the information to the controller 10. With the controller 10 transmits the first device controlling signal and the second device controlling signal, the wheel 14 can adopt to any conditions so that the shell can keep in the stable situation. The modes that can be applied when the chassis 1 is in motion are off-road mode, climbing mode, stairs mode and turning mode. The mobility device 2 sends a controlling signal, including a mode selection message to let the controller initiate the computing of the selected mode according to the current environmental conditions. The following embodiments describe the operation of each mode.

Figure 7:
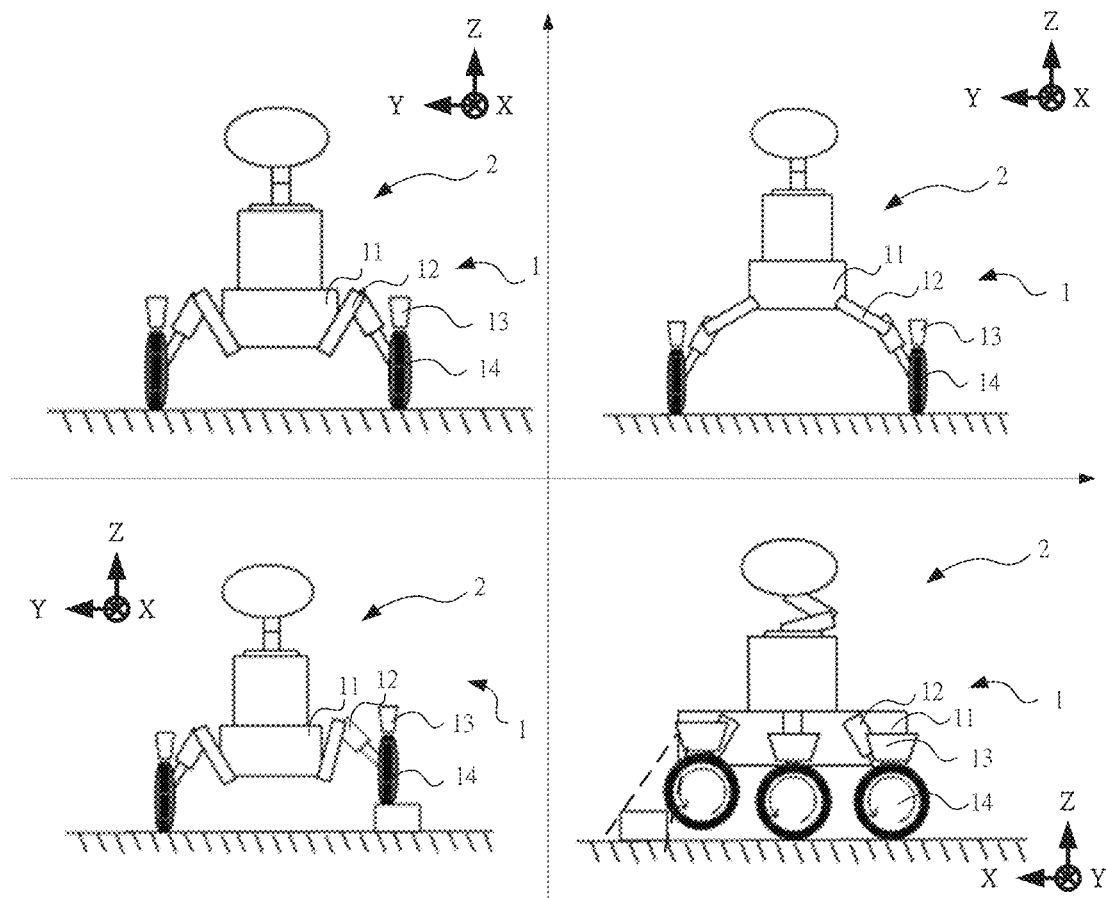
FIG. 7 shows the chart about the obstacle mode operation of the chassis.

FIG. 7 is a chart showing the action of the chassis 1 in the obstacle mode, but the controller is not disclosed in FIG. 7. In the present embodiment, the mobility device 2 is a robot. At this time, the sensor 13 can be placed separately above the suspension 11; or when using a wheel hub motor in other embodiments, the sensor 13 can be fixed in the wheel hub motor. In terms of quantity, the number of the sensors 13 is the same as the number of the wheels 14. Although the number of the wheels 14 is six and the number of the sensors 13 is 6, the embodiment of the present invention applies to four-wheel steering or six-wheel steering. Firstly, please refer to the drawings of the first quadrant and the second quadrant of FIG. 7. These two charts show that the height of the chassis 1 can be adjusted when the chassis 1 is travelling, or that each dynamic toe angle of the wheel 14 can be adjusted dynamically to change the relative position between the wheels. The wheel control in the two figures is to control the left wheel 14, the left sensor and the left steering, and the three components on the right are also controlled. In addition, the suspension 11 and the steering 12 can dynamically adjust the camber angle of the wheel 14, and the plurality of steerings 12 can also self-adjust the coordinate position of the center of mass to make the robot more adaptable while travelling. Referring to FIG. 7 for the third quadrant and the fourth quadrant of the two charts, they both indicate that when the controlling system of the robot is operated, if an obstacle is encountered on the road or the ground is not flat, the wheel 14 and the suspension 11 will automatically adjust to suit the environment and will not bypass obstacles according to the data received by the sensor 13. For example, when an obstacle is encountered, the wheel 14 will have a displacement relative to the suspension 11 at a certain time. After the sensor 13 senses the displacement amount, the signal is transmitted back to the controller. The controller will again calculate the position according to the sensing signals generated at different times and send the first device controlling signal and the second device controlling signal to the suspension 11 and the steering 12 to adjust the positions of these two gears. This process will be repeated until the robot successfully passes the obstacle. Besides, the controller sends out the first device controlling signal and the second device controlling signal to adjust the position of the wheel 14 and the suspension 11; the mobility device 2 also sends out the controlling signal to the controller at any time. By computing both controlling signals and censoring signals, the controller can adjust the position of suspension 11 and steering 12. In addition, since the single steering 12 can only control the single wheel 14 that is connected to them in the present embodiment, the single steering 12 cannot control the wheels 14 that are indirectly connected to it via the suspension 11. Therefore, when different wheels 14 pass through different obstacles, each wheel 14 can be individually adjusted to correspond to the relative position or speed of the suspension 11. At different times, six wheels 14 may have different conditions, but the controller 10 has a memory function and can combine the second physical quantities of different wheels 14 at different times to calculate the controlling signals of the first device and the second device, so that the controller 31 can adjust the mobility device 2 and the center of mass of the chassis 1; or, according to the collected speeds and times from the previous wheel 14 when it encountered an obstacle, the controller can adjust to avoid the next time or next wheel 14 encounters an obstacle. In order to avoid the dead angle, the sensor 13 is added to the suspension 11 to enhance obstacle detection and to reinforce the lack of obstacles detected by the mobility device 2.

Figure 8:
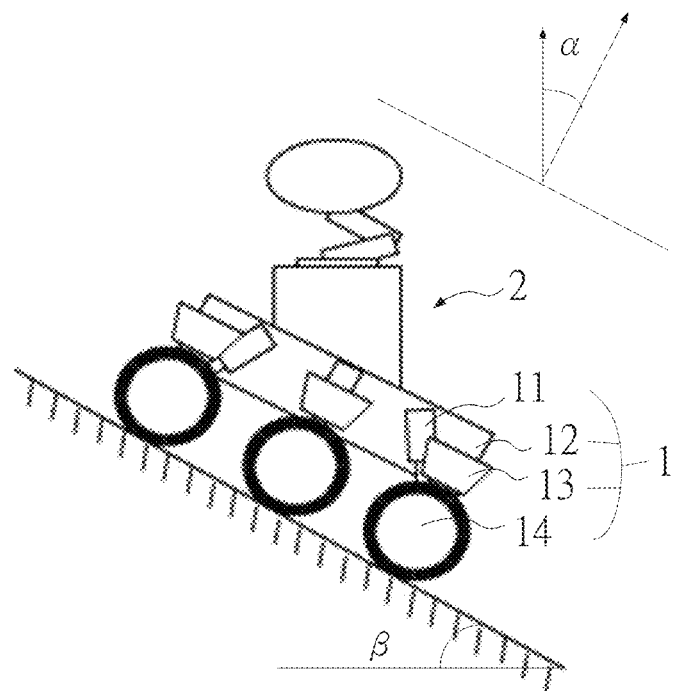
FIG. 8 shows the chart about the climbing mode operation of the chassis.

FIG. 8 is a chart showing the operation of the chassis 1 in the climbing mode; and the mobility device 21 used in the present embodiment is a robot, and the controller is not disclosed. When the chassis 1 climbs the hill, the mobility device 2 leans forward to keep the mobility device 2 stable. Generally, the tilt angle α of the mobility device 2 is defined as follows: the current central axis and the slope of the mobility device 2 are equal to the inclined angle of the slope normal vector. The inclined angle of the mobility device 2 is equal to the inclination angle β of the slope. When climbing, the suspension 11 of the chassis 1 also automatically adjusts the relative distance between the wheel 14 and the suspension 11 and keeps this distance according to the slope. When climbing a stable slope, a fixed relative distance is maintained between wheels 14 while travelling. The wrapping angle of each wheel 14 (the sum of the camber angle and the inclined angle) is maintained at a specific angle when climbing the hill in order to maintain the stability of the chassis 1. However, when an obstacle is encountered while climbing, the chassis 1 performs the steps as disclosed in FIG. 7, however, only the procedure of tilting angle 2 is added.

Figure 9:
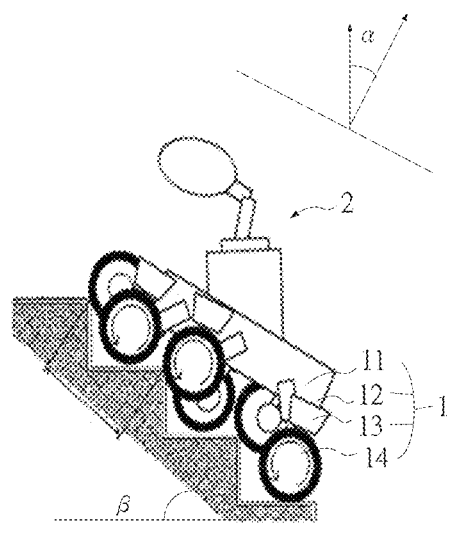
FIG. 9 shows the chart about the stairs mode operation of the chassis.

FIG. 9 is a chart showing a state when the chassis 1 is on the stairs mode and the controller is not disclosed. The biggest difference between the stairs and the climbing modes is that when climbing the stairs, the stairs have a fixed slope as a whole, but the slope between each step is periodically changed with the position. In order to deal with this terrain limitation, the slope of the stairs when the chassis 1 is climbing the stairs and changing the center of mass of the chassis 1 needs to be considered. When climbing the stairs, the controller (not shown in FIG. 9) will send out the angle information, the first device controlling signal and the second device controlling signal according to the slope of each segment, so that the suspension 11 itself has a swing angle when operating. Each wheel 14 will move alternately forward with the swing of the suspension 11, which means while traveling the reclining angle of each wheel 14 will be different with time and position, which can dynamically stabilize the chassis 1. This is the biggest difference between the stairs mode and the climbing mode. Similarly with the climbing mode, to keep the mobility device 2 stable, the mobility device 2 leans forward. When the chassis 1 goes up and down the stairs, to keep the mobility device 2 stable, the mobility device 2 leans forward. The inclination angle is defined in the specific embodiment of FIG. 8 and FIG. 8. When it is on climbing mode and stairs mode, the wheel 14 can also be changed to a conventional type of bionic foot or mechanical leg for the robot. When the wheel 14 is realized with a bionic foot or a mechanical leg, the structure of the chassis 1 is unchanged and the motion is also as what was mentioned above. The only difference between them is mechanical structures. When the bionic foot and the mechanical leg are on stairs mode, they can imitate the action of human beings or animals crawling up the stairs and can complete the action more stably and quickly. The bionic foot can be set as a mechanical leg with a joint so that it can swing back and forth. The bionic foot drives the chassis 1 so that the chassis 1 can crawl like an insect while travelling. The mechanical leg is set to have the same structure as the human foot, and the sole portion of the foot may be replaced by the wheel 14. If the wheel 14 is constructed by a mechanical leg structure, since the suspension 11 can individually control the left and right feet or the plurality of mechanical feet, the suspension 11 is a mechanical leg independent suspension.

Figure 10:
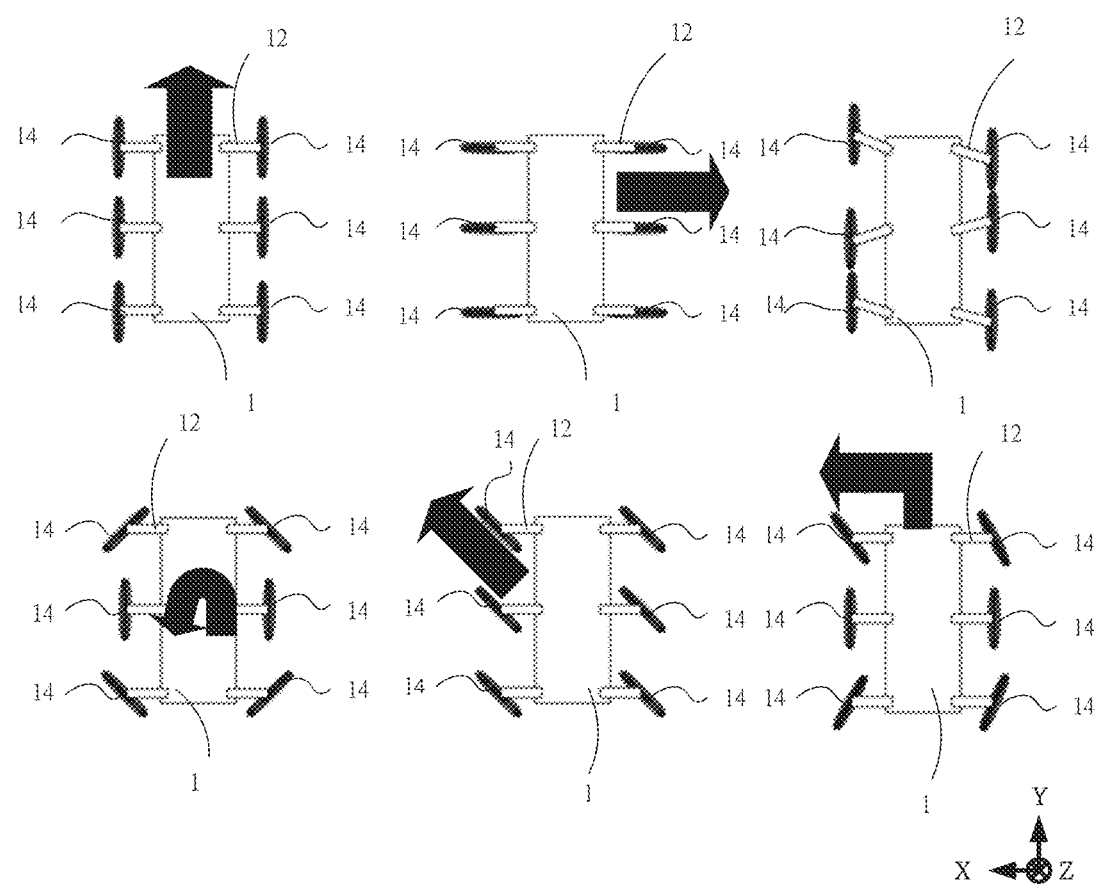
FIG. 10 shows the top view about the rotation mode operation of the chassis.

FIG. 10 is a top view showing the motion of the chassis 1 when the chassis 1 is on rotation mode and the controller is not disclosed. In FIG. 10, at least six aspects of implementing the rotation mode are disclosed, including at least six types: front-rear motion, left-right motion, alternate crawling motion, in situ rotation, oblique direction motion and small-radius steering motion-all similar to an insect crawling. These six operating motions give the chassis 1 maximum flexibility when operating. The inventor classifies the above six motion states into a 360-degree case. In a 360-degree case, the first actuating signal received by the controller (not shown in FIG. 10) includes the direction of motion and the speed of motion. The direction of motion is used to control the rolling direction of the wheel 14 (using the wheel hub as a center, clockwise or counterclockwise) and the travelling direction of the wheel 14 (using the wheel hub as a center, and the mobility device 2 as an axis, clockwise or counterclockwise). The wheel 14 axis system is applied and the speed of motion is used to control the rolling speed of the wheel 14. When the wheel 14 receives the first output command, including the direction of motion and the speed of motion from the steering 12, the travelling direction of the wheel 14 is turned ±90° with respect to the Y direction, and the forward and reverse rotation of the wheel 14 is used to achieve the linear motion of the mobility device 2 in various orientations. The following are how the controller operates and drives the rotation of the wheel 14. Assuming that the forward direction of the mobility device is 0°, the angle at which the mobility device 2 wants to turn is set to 0. The current angle of the wheel 14 is set to a, assuming again the forward direction of the mobility device is 0° (0 degree angle is defined as the same mobility device); the two angles are in a positive clockwise direction, and r is the "wheel rotation direction" variable—+1 or −1 two values. When the current direction is 0 to 90 degrees or between 270 and 360-degrees, r takes 1 and the wheel rotates forward; and when the current direction is 90-270 degrees, r takes −1 and the wheel rotates in reverse. The relationship between the travelling direction of the mobility device and the rotation direction of the wheel 14 is as shown in Equation 3:

$$\theta = \alpha + (90r + 90) \quad \text{(Equation 3)}$$

The above means that the angle at which the mobility device wants to turn is adjusted according to the current travelling direction of the wheel 14. Therefore, when the embodiment of the 360-degree case is used, the chassis 1 applies a six-wheel turning method, which is more common than the conventional four-wheel turning method. With two more wheels, it increases the complexity of controlling. A 360-degree case can directly adjust the angle of the six wheels with respect to the +Z axis when viewed from above, which is suitable when the rotation of the mobility device 2 is not required in order to rotate the traveling direction of the chassis 1. On rotation mode, another aspect is a rotation case, which is used in the 360-degree case without moving the mobility device 2. The rotation case is suitable when the rotation of mobility device 2 is required in order to change the travelling direction of the chassis 1. Please refer to FIG. 11 in which the controller is not disclosed. In a rotation state, the controller calculates and adjusts the direction of the wheel 14 and the rolling speed of each wheel 14 to realize the turning of the mobility device around a center. The following details how the controller calculates and drives the rotation of the wheel.

Figure 11:
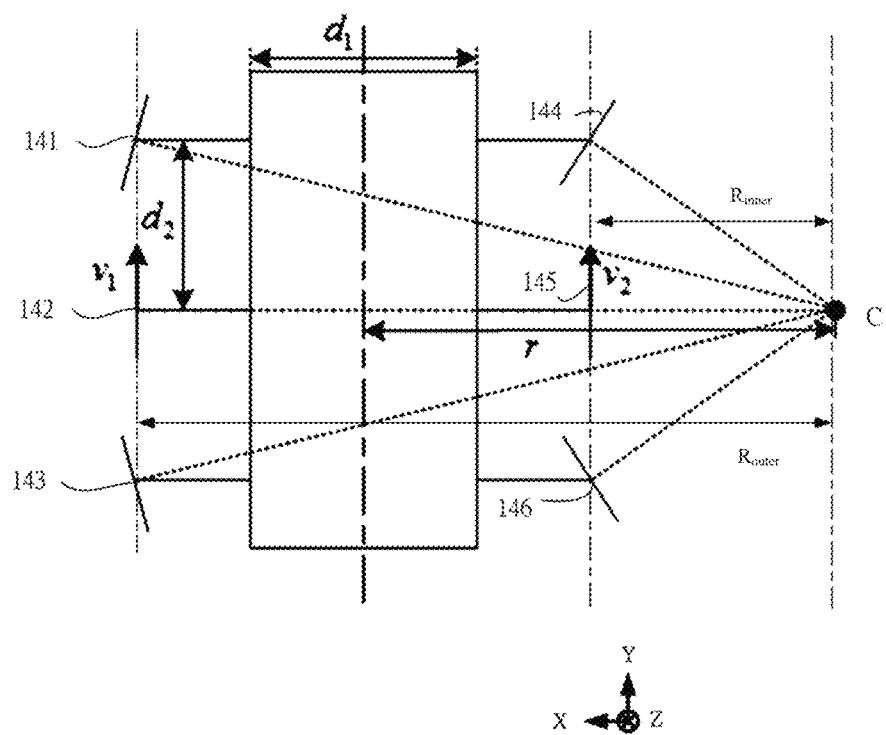
FIG. 11 is a schematic diagram showing the rotation mode of the chassis in the rotation mode, and the movement of the overall chassis.

FIG. 11 is a schematic view showing the rotation state of the chassis 1 on rotation mode and the travelling state of the entire chassis 1. As can be seen from FIG. 11, the current set rotation center C extends in a straight line connecting the axle centers of two center wheels 14 (and the wheel 142 and the wheel 145) of the robot control system; then, during the turning process, the direction of the axle centers of two center wheels 14 of the robot control system relative to the mobility device does not change and will remain parallel to the mobility device. At this time, from the top view, the turning process of the robot control system can be regarded as a rectangular shape (mobility device) rotating around the center of the rotation with the width of $d_1$. Since the center of rotation of each wheel is the same during the turning process (the robot control system is regarded as a mass point), the turning angular velocity co of each wheel 14 is the same. If the distance of the axle center between the wheel 142 and the wheel 144 is $d_1$ (i.e., the width of the mobility device) during the turning process, the running speed of the wheel 142 is $V_1$ and the travelling speed of the wheel 145 is $V_2$, then the turning angular velocity can be obtained by Equation 4:

$$\omega = \frac{V_1}{r + \frac{d_1}{2}} = \frac{V_2}{r - \frac{d_1}{2}} \quad \text{(Equation 4)}$$

At this time, the travelling speed of the wheel 142 can be derived from Equation 4, which is expressed in Equation 5:

$$V_1 = V + \frac{Vd_1}{2r} \quad \text{(Equation 5)}$$

The travelling speed of the wheel 145 can be derived from Equation 4, which is expressed in Equation 6:

$$V_2 = V - \frac{Vd_1}{2r} \quad \text{(Equation 6)}$$

Based on this radius of rotation, the radius of rotation of the wheel 142 and the wheel 145 as it rotates relative to the center of rotation C can be obtained. Since the wheelbases of the left wheels 141, 142, and 143 and right wheels 144, 145, and 146 are the same, the radius of rotation of the left wheels 141, 2, and 3 is the same, which is $R_{outer}$, and the radius of rotation of the right wheels 144, 5, 6 is the same, which is $R_{inner}$. If the wheelbases of the wheel 141 and wheel 142 are $d_2$ then, according to Pythagorean Theorem, the turning radius of the wheel 142 can be derived, which is expressed in Equation 7:

$$R_{outer} = \sqrt{d_2^2 + \left(r + \frac{d_1}{2}\right)^2} \quad \text{(Equation 7)}$$

Similarly, the turning radius of the wheel 145 is expressed in Equation 8:

$$R_{inner} = \sqrt{d_2^2 + \left(r - \frac{d_1}{2}\right)^2} \quad \text{(Equation 8)}$$

Since the angular velocities are the same, the travelling speed of the corresponding wheel 142 can be derived from Equations 5 and 7, as shown in Equation 9:

$$V_1 = \frac{\sqrt{d_2^2 + \left(r + \frac{d_1}{2}\right)^2}}{r + \frac{d_1}{2}} \cdot \left(V + \frac{Vd_1}{2r}\right) \quad \text{(Equation 9)}$$

Similarly, the travelling speed of the wheel 145 can be derived from Equations 6 and 8, as shown in Equation 10:

$$V_2 = \frac{\sqrt{d_2^2 + \left(r - \frac{d_1}{2}\right)^2}}{r - \frac{d_1}{2}} \cdot \left(V - \frac{Vd_1}{2r}\right) \quad \text{(Equation 10)}$$

According to this, the turning angle of the wheel 142 is $$\arctan\left(\frac{d_2}{r + \frac{d_1}{2}}\right),$$

the turning angle of the wheel 145 is $$\arctan\left(\frac{d_2}{r - \frac{d_1}{2}}\right).$$

Therefore, when the rotating state is performed, the chassis 1 applies a six-wheel turning method. Please refer to FIG. 2 and FIG. 11 together. When the turning state of the rotation mode is performed, the controller (not shown in FIG. 2 and FIG. 11) will first output a 360-degree case and a turning signal to six wheels. If the wheel 14 receives a 360-degree case signal, the six wheels will rotate the same angle and send out the commands including the rotation angle and the travelling speed to the controller. The controller then applies Equation 3 to calculate the turning angle θ of the mobility device, which also includes the second operational command to transfer the commands to the mobility device 2, so that the target angle for the operator can be achieved. Also, there are different angles that the mobility device wants to turn at different times. In addition, when the wheel 14 receives the rotation state signal, the wheels 141, 143, 144 and 146 will firstly rotate at a specific angle, but the wheels 142 and 145 do not change their current position. The travelling speed of the wheels 142 and 145, the distances between wheels 14, and the second physical quantity of the turning angular velocity of the robot control system, are all sent out to the controller. After the controller estimates the turning angles, travelling speeds, and a turning center C of the wheels 142 and 145 according to Equation 4 to Equation 10, the second physical quantity (not shown) will be sent back to rotate the mobility device of the robot control system to meet the needs of the operator. The different rotation angles are also required at different times. The following describes the implementation of the 4-wheel drive mode.

Figure 12:
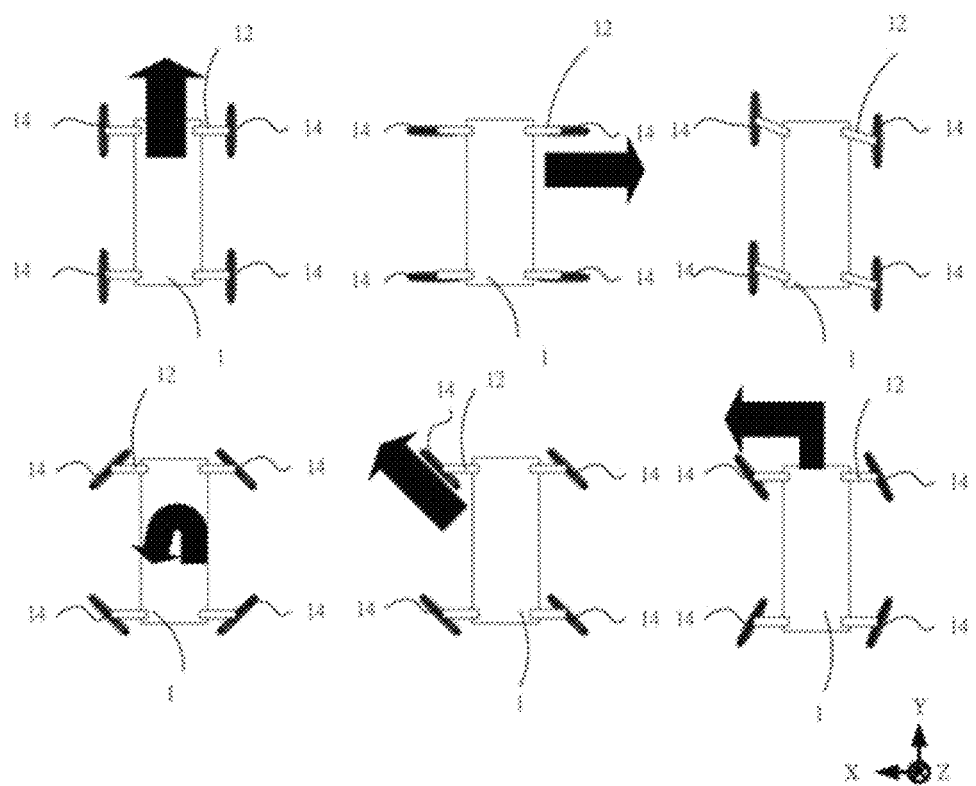
FIG. 12 is a top view of showing the movement of the chassis when the chassis is in the four-wheel drive mode.

FIG. 12 is a top view showing the motion of the chassis 1 when the chassis 1 is in rotation mode, but the controller is not disclosed. In FIG. 12, at least six aspects of implementing the rotation mode are disclosed, including at least six types: front-rear motion, left-right motion, alternate crawling motion, in situ rotation motion, oblique direction motion and small-radius steering motion, all of which is like an insect crawling. These six operating motions give the chassis 1 maximum flexibility when operating. The inventor classifies the above six motion states into a 360-degree case. In a 360-degree case, the first actuating signal received by the controller (not shown in FIG. 12) includes the direction of motion and the speed of motion. The direction of motion is used to control the rolling direction of the wheel 14 (using the wheel hub as a center, clockwise or counterclockwise) and the travelling direction of the wheel 14 (using the wheel hub as a center, and the mobility device 2 as an axis, clockwise or counterclockwise). The wheel 14 axis system is applied and the speed of motion is used to control the rolling speed of the wheel 14. When the wheel 14 receives the first output command, including the direction of motion and the speed of motion from the steering 12, the travelling direction of the wheel 14 is turned ±90° with respect to they direction, and the forward and reverse rotation of the wheel 14 is used to achieve the linear motion of the mobility device 2 in various orientations. Details listed below are how the controller operates and drives the rotation of the wheel 14. Assuming that the forward direction of the mobility device is 0°, the angle at which the mobility device 2 wants to turn is set to 0. The current angle of the wheel 14 is set to α, assuming again the forward direction of the mobility device is 0° (0 degree angle is defined as the same mobility device); the two angles are in a positive clockwise direction, and r is the "wheel rotation direction" variable—+1 or −1 two values. When the current direction is 0 to 90 degrees or between 270 and 360-degrees, r takes 1 and the wheel rotates forward; and when the current direction is 90-270 degrees, r takes −1 and the wheel rotates in reverse. The relationship between the travelling direction of the mobility device and the rotation direction of the wheel 14 is as shown in Equation 3:

θ=α+(90r+90) (Equation 3), which means that the angle at which the mobility device wants to turn is adjusted according to the current travelling direction of the wheel 14.

On turning mode, another aspect is a rotation case, which is used in a 360-degree state without moving the mobility device 2. The rotation case is suitable when the rotation of the mobility device 2 is required, which can change the travelling direction of the chassis 1. Please refer to FIG. 13 but the controller is not disclosed again. In a rotation state, the controller calculates and adjusts the direction of the wheel 14 and the rolling speed of each wheel 14 to realize the turning of the mobility device around a center. The following details how the controller calculates and drives the rotation of the wheel. It can be seen from FIG. 13 that the currently set rotation center C is at the intersection point of the four wheel diagonals of the robot control system (the interaction point of 141, 146 axle connection line and 143, 144 axle connection line); therefore, from the top view, showing that the turning process of the entire robot control system can be seen as a rectangle (mobility device) rotating around the center of rotation during the turning process. Since the center of rotation of each wheel is the same during the turning process (with the robot control system regarded as a mass point), the turning angular velocity w of each wheel 14 is the same. The following solution assumes that C-speed angular velocity of the chassis center point is not 0, and the angular velocity is greater than 0. The solution is assumed that the distances between the axle center of the wheel 141 and the wheel 144 is $d_1$ (the width of the mobility device), and the distances between the axle center of the wheel 141 and the wheel 143 is $d_2$ (the length of the mobility device). During the turning process, the linear velocity of the center point C is and the angular velocity is w, and then the turning radius of the mass point derives from Equation 11:

$$r = \frac{v}{w} \qquad \text{(Equation 11)}$$

Based on this radius of rotation, the radius of rotation of the wheel 141, 143 and the wheel 142, 146 as it rotates relative to the center of rotation C can be obtained. Since the wheelbases of the left wheels 141, 143 and right wheels 144, 146 are the same, the radius of rotation of the left wheels 141,143 is the same, which is $r_2$ and the radius of rotation of the right wheels 144, 146 is the same, which is $r_3$. According to Pythagorean theorem, the turning radius of the wheel 141,143 can be derived, and which is expressed in Equation 12:

$$r_2 = \sqrt{\left(\frac{d_2}{2}\right)^2 + \left(v - \frac{d_1}{2}\right)^2} \qquad \text{(Equation 12)}$$

The turning radius of wheels 142/146 can be derived from Equation 13:

$$r_3 = \sqrt{\left(\frac{d_2}{2}\right)^2 + \left(v + \frac{d_1}{2}\right)^2} \qquad \text{(Equation 13)}$$

Since four wheels travel around a mass point, the angular velocities w of all four wheels are the same. Because the wheels 141, 143 are on the left side, the wheels 141, 143 have the same speed and steering angle. The rotating speed of the wheels 141, 143 can be derived from Equation 14:

$$v_1 = r_2 * w \qquad \text{(Equation 14)}$$

Similarly, the rotating speed of the wheels 144, 146 can be derived from Equation 15:

$$v_2 = r_3 * w \qquad \text{(Equation 15)}$$

The steering angle $w_1$ of the wheels 141/143 can be derived from the Equation 16:

$$w_1 = \arctan\left(\frac{\frac{d_2}{2}}{r - \frac{d_1}{2}}\right) \qquad \text{(Equation 16)}$$

The steering angle of the wheel 144/146 can be derived from the Equation 17:

$$w_2 = \arctan\left(\frac{\frac{d_2}{2}}{r + \frac{d_1}{2}}\right) \quad \text{(Equation 17)}$$

Refer to Equations 14, 15, 16 and 17 for the rotating speed and steering direction of the four wheels to achieve control of the chassis.

Figure 13:
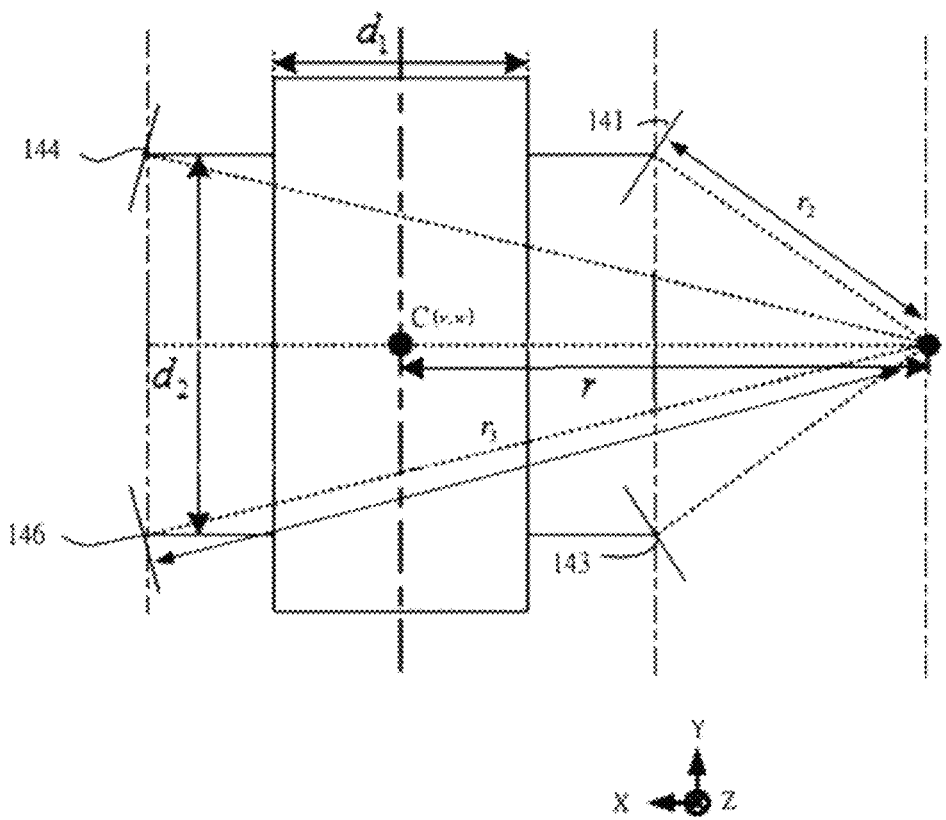
FIG. 13 is a schematic view of showing the rotation of the chassis in the four-wheel drive mode, and the movement of the chassis.

Please refer to FIG. 2 and FIG. 13 together. When the turning state of rotation mode is performed, the controller (not shown in FIG. 2 and FIG. 13) will first output a 360-degree case and a turning signal to four wheels. If the wheel 14 receives a 360-degree case signal, the four wheels will rotate the same angle and send out the commands including the rotation angle and the travelling speed to the controller. The controller then applies Equation 3 to calculate the turning angle θ of the mobility device, which also includes the second operational command based on the current situation to transfer the commands to the mobility device 2, so that the target angle for the operator can be achieved.

Also, there are different angles that the mobility device wants to turn at different times. In addition, when the wheel 14 receives the rotation state signal, the wheels 141, 143, 144 and 146 will firstly rotate at a specific angle. The travelling speed of the wheels 141, 143, 144 and 146, the distances between wheels 14 and the second physical quantity of the turning angular velocity of the robot control system are sent out to the controller. After the controller estimates the turning angles, travelling speeds, and a turning center C of the wheels 141, 143, 144 and 146 according to Equation 11 to Equation 17, the second physical quantity (not shown) will be sent back to rotate the mobility device of the robot control system to meet the needs of the operator. Different rotation angles are also required at different times.

In summary, the present invention provides a chassis 1. Not only is the chassis a simple structure, but also it can control the relative height of the chassis from the ground by the suspension 11, so that the chassis 1 can be used in various terrains and environments and still maintain the stable chassis. The wheels 14 allow the chassis to move correctly and quickly to the desired location. With different mobility device 2 of the robot or of a vehicle, the chassis can be used for different purposes. In addition, the chassis 1 disclosed in the present invention can travel in the obstacle mode, the climbing mode, the stairs mode and the turning mode, and it can travel in different terrains and environments, so it can be widely used on robots and vehicles. The implementation mentioned above is the preferred embodiment of the present invention and is not intended to limit the scope of the present invention. The descriptions mentioned above should be understood and implemented by those skilled in the relevant technology fields, so that any other embodiments are not deviated from the spirit of the present invention. Equivalent changes or modifications shall be included in the scope of this patent application.

While the invention has been described in terms of what is presently considered to be the most practical and preferred embodiments/implementations, it is to be understood that the invention needs not to be limited to the disclosed embodiments/implementations. On the contrary, it is intended to cover various modifications and similar arrangements included within the spirit and scope of the appended claims which are to be accorded with the broadest interpretation so as to encompass all such modifications and similar structures.

What is claimed is:

1. A chassis (1) which is connected with a mobility device (2), comprises:
    a suspension (11) disposed under a bottom of the mobility device (2);
    a steering (12) connected pivotally to the suspension (11);
    a controller (10) connected electrically both to the suspension (11) and the steering (12);
    a wheel (14) connected electrically and pivotally to the steering (12), and disposed under the steering (12); and
    a sensor (13) connected electrically to the controller and set up outside of the wheel (14) through a long lever (15) for monitoring coordinate positions of the suspension (11), the steering (12) and the wheel (14);
    wherein a steering shaft of the steering (12) axially coincides with a steering shaft of the wheel (14), so the controller (10) can govern the turning direction of the wheel (14) and the height of the suspension (11) through the suspension (11) and the steering (12), and wherein when an obstacle is encountered, the sensor (13) senses a displacement amount of the wheel (14) and transmits a sensing signal back to the controller (10) for calculating a position of the wheel (14) according to the sensing signal, the mobility device (2) also sends a controlling signal to the controller (10), the controller (10) then sends a first device controlling signal including coordinate values to the suspension (11) and a second device controlling signal including an angle vector value or a velocity vector value to the steering (12) after computing both the controlling signal and the sensing signal, the suspension (11) and the steering (12) further send a first output command and a second output command to the wheel (14) according to the first device controlling signal and the second device controlling signal respectively, so to control the wheel (14).

2. The chassis (1) according to claim 1, wherein the suspension (11) is an independent, non-independent, or a mechanical leg suspension.

3. The chassis (1) according to claim 1, wherein the suspension is configured to adjust the chassis (1) height from the ground.

4. The chassis (1) according to claim 1, wherein the steering further comprises a damper (121) configured to connect to the center of the wheel (14).

5. The chassis (1) according to claim 1, wherein the steering (12) is configured to change the camber angle, the inclination angle, the toe angle and the caster angle of the wheel (14).

6. The chassis (1) according to claim 1, wherein the controller (10) is connected electrically and wirelessly to both the suspension (11) and the steering (12).

7. The chassis (1) according to claim 1, wherein the wheel (14) is configured to a number which is more than 2 and is an even number, and configured to a drum or sphere.

8. The chassis (1) according to claim 1, wherein the motion of the chassis (1) includes an obstacle mode, a climbing mode, a stairs mode and a turning mode.

9. The chassis (1) according to claim 8, further comprises a 360-degree case and a rotation case when the chassis (1) is in the turning mode.

10. A robot applied to a chassis (1), the robot includes a body, a shell, a bottom portion and the chassis (1), wherein the shell and the bottom portions are connected to each other by a pivot shaft, and the chassis (1) is connected pivotally to the bottom portion, and the chassis (1) comprises:

a suspension (11) disposed under the bottom of the robot;
  a steering (12) connected pivotally to the suspension (11);
  a controller (10) connected electrically both to the suspension (11) and the steering (12);
  a wheel (14) connected electrically and pivotally to the steering (12), and disposed under the steering (12); and
  a sensor (13) connected electrically to the controller and set up outside of the wheel (14) through a long lever (15) for monitoring coordinate positions of the suspension (11), the steering (12) and the wheel (14);
  wherein a steering shaft of the steering (12) axially coincides with a steering shaft of the wheel (14), so the controller (10) can govern the turning direction of the wheel (14) and the height of the suspension (11) through the suspension (11) and the steering (12), and wherein when an obstacle is encountered, the sensor (13) senses a displacement amount of the wheel (14) and transmits a sensing signal back to the controller (10) for calculating a position of the wheel (14) according to the sensing signal, the robot also sends a controlling signal to the controller (10), the controller (10) then sends a first device controlling signal including coordinate values to the suspension (11) and a second device controlling signal including an angle vector value or a velocity vector value to the steering (12) after computing both the controlling signal and the sensing signal, the suspension (11) and the steering (12) further send a first output command and a second output command to the wheel (14) according to the first device controlling signal and the second device controlling signal respectively, so to control the wheel (14).

11. The robot applied for the chassis (1) according to claim 10, wherein wherein the suspension (11) is an independent, non-independent, or a mechanical leg suspension.

12. The robot applied for the chassis (1) according to claim 10, wherein the suspension is configured to adjust the chassis (1) height from the ground.

13. The robot applied for the chassis (1) according to claim 10, wherein the steering further comprises a damper (121) configured to connect to the center of the wheel (14).

14. The robot applied for the chassis (1) according to claim 10, wherein the steering (12) is configured to change the camber angle, the inclination angle, the toe angle and the caster angle of the wheel (14).

15. The robot applied for the chassis (1) according to claim 10, wherein the controller (10) is connected electrically and wirelessly to both the suspension (11) and the steering (12).

16. The robot applied for the chassis (1) according to claim 10, wherein the wheel (14) is configured to a number which is more than 2 and is an even number, and and configured to a drum or sphere.

17. The robot applied for the chassis (1) according to claim 10, wherein the motion of the chassis (1) includes an obstacle mode, a climbing mode, a stairs mode and a turning mode.

18. The robot applied for the chassis (1) according to claim 17, further comprises a 360-degree case and a rotation case when the chassis (1) is in the turning mode.

* * * * *